United States Patent [19]

Knitsch

[11] Patent Number: 5,353,344
[45] Date of Patent: Oct. 4, 1994

[54] METHOD OF DETERMINING LEVELS AT GIVEN FREQUENCIES OF A VF SIGNAL

[75] Inventor: Martin A. Knitsch, Bonstetten, Switzerland

[73] Assignee: Alcatel STR AG, Zurich, Switzerland

[21] Appl. No.: 947,069

[22] Filed: Sep. 18, 1992

[30] Foreign Application Priority Data

Sep. 24, 1991 [CH] Switzerland ............ 02 832/91-3

[51] Int. Cl.$^5$ .................. G06F 15/31; H04M 3/00
[52] U.S. Cl. .................. 379/386; 379/283; 364/724.09
[58] Field of Search .......... 379/386, 282, 283; 328/138, 139; 364/724.09, 724.06, 726

[56] References Cited

U.S. PATENT DOCUMENTS

| | | | |
|---|---|---|---|
| 3,875,347 | 4/1975 | Alaily | 379/386 |
| 4,460,806 | 7/1984 | Canniff et al. | 379/386 |
| 5,119,322 | 6/1992 | Stroobach | 364/724.09 |
| 5,163,050 | 11/1992 | Cromack | 379/88 |
| 5,214,693 | 5/1993 | Chujo | 379/283 |

FOREIGN PATENT DOCUMENTS

| | | | |
|---|---|---|---|
| 1188015 | 5/1985 | Canada | 379/386 |
| 2219174 | 11/1989 | United Kingdom | |

OTHER PUBLICATIONS

ADSP-2100 Family Applications Handbook, vol. 2, 6-22 to 6-25 Analog Devices Inc.

Goertzel G.: "An Algorithm For the Evaluation of Finite Trigonometric Series," American Mathematics Monthly, vol. 5, 1958.

Digital Signal Processing Applications with the TMS320 Family: pp. 552-555.

Verdun F. R., Giancaspro C., Marshall A. G., "Effects of Noise on the 'Exact' Interpolation of Fast Fourier Transform Spectra", Applied Spectroscopy, vol. 42, No. 5, 1985 pp. 715-717.

"Digital MF Receiver Using Discrete Fourier Transform", Ivan Koval and George Gera, IEEE vol. Com-21, No. 12, Dec. 1973, pp. 1331-1335.

"Digital Integrated Circuit SM301-A4 with Special Filter for Processing Inband Dual-Tone Switching Signals," K. D. Rother and F. V. Sichart, pp. 256-260 Seimens Forsch.-u.Entwickl.-Ber. Bd. 8 (1979) Nr. 5, Springer-Verlag 1978.

International Conference on Acoustics, Speech and Signal Processing, bd 2, 23, Mai 1989, Glasgow, Scotland Seiten 1334-1137, XP90308 S. L. Gay et al. 'Algorithms for Mutlti-Channel DTMF detection for the WE DSP32 family' *das ganz Dokument*.

EDN Bd. 30, Nr 6, 1985, Bostonm, Mass.-USA, Seiten 205-220 P. Mock 'Add DTMF generation and Decoding to DSP-uP Designs' *das ganz Document*.

*Primary Examiner*—James L. Dwyer
*Assistant Examiner*—Scott L. Weaver
*Attorney, Agent, or Firm*—Ware, Fressola, Van Der Sluys & Adolphson

[57] ABSTRACT

A dialing receiver (1) for determining multifrequency dialing signals on an incoming signal in a telecommunication switching system, including a sampling circuit (4) for taking N values of the incoming signal at a given sampling rate, where N is a positive integer; a zero value generator circuit (6) for supplementing at the given sampling rate the N samples with M successive zero values so as to yield N+M values, where M is a positive integer; a discrete Fourier transformation circuit (7) for performing a discrete Fourier transform (DFT) of said N+M values in accordance with the Goertzel algorithm; and a result evaluating circuit (8) for directly evaluating the results of the DFT processing of the N+M values without interpolation so as to determine the identity of the multifrequency dialing signals.

16 Claims, 1 Drawing Sheet

METHOD OF DETERMINING LEVELS AT GIVEN FREQUENCIES OF A VF SIGNAL

FIELD OF THE INVENTION

The present invention relates to a method of determining the levels of an incoming voice frequency signal at selectable given frequencies with digital signal processing, wherein the incoming signal is sampled and the received N samples are submitted to a discrete Fourier transform. The invention relates further to an application of said method for a dialling receiver for multi-frequency dialling signals in a telecommunication switching system.

BACKGROUND OF THE INVENTION

In the following description references will be made to the following publications:

(1) ADSP-2100 Family applications Handbook, Vol. 2, 6–22 to 6–25 Analog Devices Inc.

(2) Zoicas A., Grohe K. "8-Kanal-DTMF-Empfänger: Keine weirere Hardware mehr nötig", Elektronik, 16/4, 1989, p. 65–62

(3) Oppenheim A., Schafer R. "Digital Signal Processing", Prentice Hall, Engelwood Cliffs, N.J., 1975, p. 290 ff (4) Goertzel G.: "An Algorithm for the Evaluation of Finite Trigonometric Series", American Mathematics Monthly, Vol. 5, January 1958

(5) Digital Signal Processing Applications with the TMS320 Family: p. 552–555, Texas Instruments (6) Verdun F. R., Giancaspro C., Marshall A. G. "Effects of Noise, Time-Domain Damping, Zero-Filling on the "Exact" Interpolation of Fast Fourier Transform Spectra", Applied Spectroscopy, Vol 42, Nr. 5, 1988, p. 715–721.

Dialling receivers for MF signals are known e.g. from (1) and (2). Since with the MF dialling method the signalling is performed within the speech band there is needed a voice frequency protection in order to be able to detect dialling signals with a simultaneous transmission of speech or similar signals or to prevent speech signals from being interpreted as signalling signals. This voice frequency protection has led to a two frequencies code. To each dialling digit or to each special character there is allocated a combination of two simultaneously transmitted signals of respective given frequencies, the two frequencies belonging to two clearly spaced groups. Both frequency groups consist each of four distinct frequencies so that a total of 16 characters are possible. Said frequencies are chosen in such a manner that there exist no harmonic relations between the basic frequencies, their harmonics and the respective intermodulation products. For a further protection against an accidental imitation of dialling signals by speech signals the absolute and relative levels of the two frequencies of one character have to be within given limits.

The call for the absence of any harmonic relation between the basic frequencies, their harmonics and the respective intermodulation products has the result that the spacings of the frequencies of the two groups are very different so that several known methods of determining the levels of said frequencies, i.e. for their recognition seem to be unsuitable due to an insufficient accuracy or due to a too large design effort.

The MF dialling method is well adapted both for telecommunication networks using analog signalling and those using digital signalling. With analog signalling and digital processing of ht dialling information within a dialling receiver the analog input signal has to be digitized prior to its processing. The dialling receiver takes a certain number of samples from its input signal. The exact number results from the sampling frequency and the duration of detection. With digital signalling and the usual PCM coding the sampling frequency cannot exceed 8 kHz. The maximum duration of detection is limited by the required minimum duration of key operation. The latter and the interval duration are fixed by the signalling protocol of the respective telecommunication network. Signalling protocols of this kind are e.g. "DTMF", "R1" or "R2". They are laid down in CCITT recommendations Q.23 and Q.24, Q.320 and Q.323 and Q.454 and Q.455 respectively.

For dialling receivers with digital signalling the maximum number of samples usable for the recognition of a distinct dialling character depends also from the manner of processing by the processor, from tis capability and from the number of channels to be monitored.

Prior art dialling receivers with digital signal processing take N samples from the input signal and detect based on said samples the levels of the input signal at the frequencies of interest. For doing this they perform a Discrete Fourier Transform (DFT) of said samples.

One may think to perform the DFT at the frequencies of interest only, but this would result in a too large design effort with digital integration. Further one may think to perform the DFT according to a Fast Fourier Transform (FFT) as described e.g. in (3). Therewith the levels would be received at $N/2$ evenly distributed frequencies and the value of N must be $N=2^x$ and should not be too small in view of the required accuracy. The levels of the frequencies of interest have to be determined with the aid of interpolation methods. If the number of frequencies of interest is substantially smaller than $N/2$ and said frequencies are unevenly distributed an FFT combined with interpolation methods results in an unnecessary processing load as the levels at a large number of frequencies without interest have to be determined.

It is known from the literature that it is possible to perform a DFT on a recursive basis, e.g. in [4] G. Goertzel describes an algorithm to obtain the numerical evaluation of $$C = a0 + a1 \cdot \cos(x) + a2 \cdot \cos(2x) + \ldots + ak \cdot \cos(kx) + \ldots + An \cdot \cos(Nx) \text{ and}$$

$$S = a1 \cdot \sin(x) + a2 \cdot \sin(2x) + \ldots + ak \cdot \sin(kx) + \ldots + An \cdot \sin(Nx),$$

i.e. the terms needed for a DFT, based on a recursive calculation needing the values of ak, cos(x) and sin(x) only, but not cos(kx) and sin(kx). The algorithm is defined by:

$$U(N+2) = U(N+1) = 0;$$

$$U(k) = ak + 2 \cdot \cos(x) \cdot U(k+1) - U(k+2), \ k = N, N-1, \ldots, 1;$$

$$C = a0 + U(1) \cdot \cos(x) - U(2); \text{ and}$$

$$S = U(1) \cdot \sin(x).$$

As can be seen, the necessary calculations are not applied to a data set already stored as with the FFT but to a sequential data stream. This means that the input values have not to be stored so that the size of the internal data store is greatly reduced.

The eight frequencies standardized by CCITT by their recommendation Q.23 for the DTMF multifrequency dialing system are unevenly distributed. With a FFT one would have to evaluate the signal levels at far too many frequencies and yet an interpolation would be necessary. With the aid of the Goertzel algorithm it is possible to determine the levels of the input signal, i.e. the amplitude of the Fourier transform at selected frequencies only, a known fact to which indication is made for example in [2]. But said frequencies can be selected only among certain evenly distributed frequencies having a distance depending from N and from the sampling frequency. If the frequencies of interest do not correspond with this grid of frequencies it is again necessary to make use of an interpolation method. An increase of N results in a finer grid.

A small increase of N does not necessarily imply an amelioration of the problem since for at least with unevenly distanced frequencies of interest, their mean distances from the grid may increase. At least for a dialling receiver there are limits for a large increase of N due to the upper limit of the sampling frequency and the maximum duration of detection. The strongly increasing processing load also limits the increase of N.

According to the above mentioned CCITT recommendation Q.23 for a dialling receiver the duration of detection should not exceed 40 ms and the sampling frequency should not exceed 8 kHz. This means that for a dialling receiver fulfilling the above recommendation the value of N must be smaller than 320. Technical reasons, especially time limitations suggest a value of N smaller than 250. From N=250 and a sampling frequency of 8 kHz there results a grid distance of 32 Hz. There are several publications discussing the optimal choice of N. For the eight DTMF frequencies as the frequencies of interest this is discussed e.g. in (1) and (5).

In order to decrease the grid distance it is possible to use a method known in signal processing as "zero-filling", where for the analysis of time limited signals not only are N measured samples used, but M zero values are also used. Therewith the signal spectrum does not change, but it is calculated at a higher number of positions. The distance of the DFT components is no longer F/N, but F/(N+M), i.e. the grid distance becomes smaller. The position for the insertion of the zeros into the calculation is completely irrelevant provided the significant data remain together.

If the level determination for certain frequencies is made with the aid of interpolation methods the zero-filling could adversely affect the relative accuracy of said interpolation. This handicap is described e.g. in (6).

SUMMARY OF THE INVENTION

It is an object of the present invention to provide a method of determining the levels of an incoming voice frequency signal at selectable given frequencies with digital signal processing with the aid of which method either the levels of the input signal at said given frequencies can determined with a given number of samples with a better accuracy than with known methods or said levels can be determined with the same accuracy as with known methods, but with a smaller number of samples, the computing load being about the same as with known methods.

The method according to the invention is characterized in that the N samples are supplemented by the processing unit with M successive zero values to (N+M) values, that the processing unit performs a discrete Fourier transform of said (N+M) values in accordance with the Goertzel algorithm, and that the levels to be determined are taken from the Fourier transform without any interpolation.

The method according to the invention combines the advantageous effects of a DFT according to the Goertzel algorithm allowing sequential calculation of the levels of the input signal limited to selected frequencies with the effects of the zero-filling allowing an almost unlimited refinement of the frequency grid without increase of the computing load so that interpolation methods are no longer needed.

The Goertzel algorithm is a special method of the DFT having the advantage that the individual samples are processed successively after their reception. With the usual DFT all samples must be present prior to the start of calculating the frequency spectrum. This algorithm is specially useful in cases where the complete spectrum of a signal is of no interest, but only few spectral components are of interest. Therewith a decrease of the computing load is achieved.

The sampling frequency F and the number N of samples shall be used now for the spectrum analysis. In this case the Goertzel algorithm is able to deliver, as any DFT, the signal amplitudes at the spectral lines or DFT components:

$$f(n) = n\frac{F}{N}, \quad n = 0, 1, 2, \ldots, N/2 - 1. \quad (1)$$

With F=8,000 Hz and N=200 there results the spectrum information at 40, 80, 120 . . . 3,960 Hz.

Certain coefficients entering into the computation have a large importance. To determine the level at the n-th spectral line having the frequency f(n)=F n/N the value of said coefficient is:

$$C(n) = \cos 2\pi \frac{n}{N} = \cos 2\pi \frac{f(n)}{F} \quad (2)$$

If the already mentioned zero-filling is applied to the Goertzel algorithm and the zero values are inserted at the start of the computation, i.e. as samples being chronologically prior to the significant samples it can be seen that the iteration values U(k) in (4) do not change their starting value zero as long as the input values remain zero. The values U(k) belonging to the significant samples take the same values independent of how much zero values were inserted earlier. This means that the computing load is exactly the same as without inserted zero values as the computations with the zero values need not be performed.

It is to be noted that insertion of zero values at the end of the calculation would change the former U(k); the absolute value of the level $\sqrt{C^2+S^2}$ would of course always be correct.

If there are chosen F=8,000 Hz, N=200 and M=7,800 the DFT components are distanced by 1 Hz. Equation (1) then changes into:

$$f(n) = n\frac{F}{N+M} \quad n = 0, 1, 2, \ldots \frac{N+M}{2} - 1 \quad (3)$$

and the pertinent Goertzel coefficients according to equation (2) become:

$$C(n) = \cos\frac{2\pi n}{N+M} = \cos\frac{2\pi f}{F} \quad (4)$$

In the last analysis ($M\to\infty$) it is possible to indicate the coefficients for any random frequency $f<F/2$:

$$C(f) = \cos\frac{2\pi f}{F} \quad (5)$$

This means that with the aid of the Goertzel algorithm it is possible even with a very small number of Samples to determine the spectral components of a signal by using the coefficients according to equation (5). There is no need to be restricted to the frequency grid given by the number of samples and to put up with the so called leakage effect. Said effect occurs when a DFT is performed at the positions only fixed by the number of samples and spectrum portions have to be determined by interpolation at positions which do not correspond exactly to the positions given by the number of samples.

The method according to the invention can be used advantageously in a dialling receiver for MF dialling signals in a telecommunication switching system where e.g. more channels than usual should be monitored. It is also applicable in network test systems wherein not only should the levels of the input signal at certain frequencies be measured to determine if they exceed a given threshold value, but also the absolute values of the levels at said frequencies should be measured as exactly as possible. Further the present method allows often to use a smaller computing capability than is possible with similar methods.

BRIEF DESCRIPTION OF THE DRAWINGS

An embodiment of the invention will now be described in conjunction with the accompanying drawing which shows a block diagram of a dialling receiver.

BEST MODE FOR CARRY OUT THE INVENTION

Figure 1:
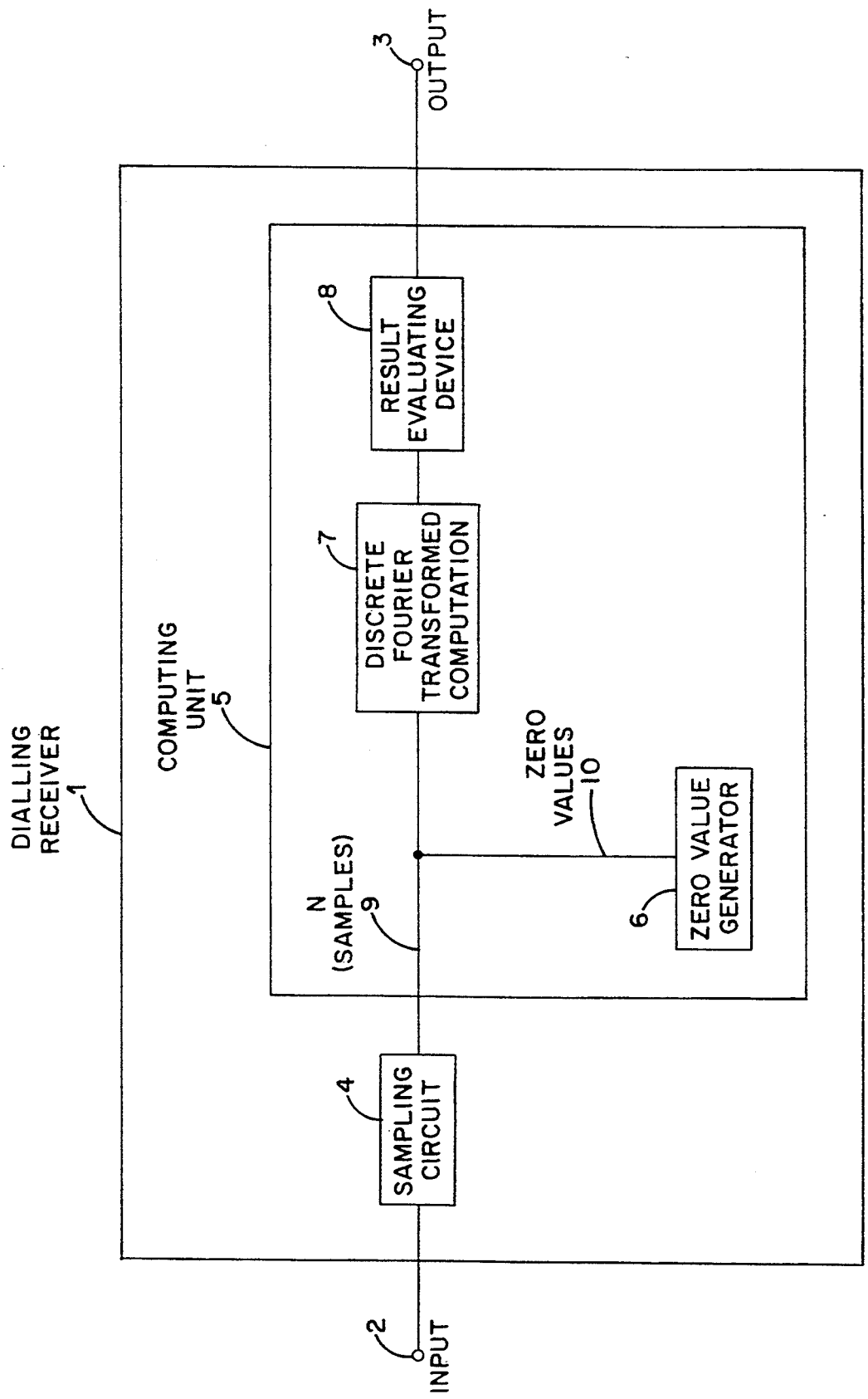

A dialling receiver 1 comprises an input 2 and an output 3 represented as a single serial output. The receiver I further comprises a sampling circuit 4 followed by a computing unit 5. The computing unit 5 comprises a zero value generator 6, a circuit 7 for computing the discrete Fourier transform and a device 8 for processing the results of the DFT. The device 8 is able to process the results of the DFT in such a manner that in case of a measuring device the exact levels at the given frequencies are provided or in case of a signalling receiver dialling signals appear at output 3 in accordance with one of the mentioned CCITT recommendations.

The signalling receiver I operating in accordance with the method of the present invention takes with the aid of the sampling circuit 4 a number of N samples on line 9 from the input signal 2 and determines based on said samples the levels of the input signal at given, mostly unevenly distributed frequencies. For this purpose the computing unit 5 performs a DFT from said samples. But said DFT is not performed from the samples on line 9 only, but from a number of values consisting of N samples and M successive zero values. As already mentioned neither the signal spectrum will be changed thereby nor the computing load will be increased. The zero values are delivered by the generator 6 on line 10. As already mentioned the device 8 processes the output signal of the circuit 7 in such a manner that the desired signal will appear at output 3, e.g. the exact level of the dialling signal and/or the dialling signal itself.

The following table shows the levels of an input signal at the eight DTMF frequencies. The input signal contains the two DTMF frequencies 770 Hz and 1,336 Hz only. The left side columns contain the level measuring values obtained by a usual dialling receiver with the aid of the Goertzel algorithm combined with a stepped interpolation method. There were used 205 samples used, thus N=205. This number is commonly known to be the best value to recognize DTMF dialling signals as described e.g. in (1). The right side columns contain the level measuring values obtained by a dialling receiver operating in accordance with the method of the present invention. Again the number of samples is 205, thus N=205, the number of zero values was chosen with M=7,795 so that (N+M)=8,000 resulting in a grid distance of 1 Hz. In both cases the sampling frequency was F=8,000 Hz.

| (Hz) | Goertzel algorithm with stepped interpolation level absolute/in (dB) | | Goertzel algorithm with zero-filling level absolute/in (dB) | |
|---|---|---|---|---|
| 697 | 0.14253 | −16.92 | 0.07408 | −22.61 |
| 770 | 0.88181 | −1.09 | 0.99982 | 0.00 |
| 852 | 0.10360 | −19.69 | 0.05490 | −25.21 |
| 941 | 0.05794 | −24.74 | 0.06521 | −23.71 |
| 1209 | 0.07180 | −22.88 | 0.07546 | −22.45 |
| 1336 | 0.91469 | −0.77 | 0.00012 | 0.00 |
| 1477 | 0.05523 | −25.16 | 0.07896 | −22.05 |
| 1633 | 0.02654 | −31.52 | 0.03605 | −28.86 |

A view of the above table shows that the transmitted dialling signal frequencies 770 Hz and 1,336 Hz appear in the right side columns with their full level and that the levels at the other, not transmitted frequencies have a constant and substantial distance from the transmitted frequencies. The left side group shows at least for the lower group of frequencies clearly smaller level distances and lower levels for the transmitted frequencies with a certain level difference.

What is claimed is:

1. Method for identifying at least one given frequency in a multifrequency signal in a processing unit, comprising, in combination, the steps of:

sampling in a sampling circuit the multifrequency signal at a sampling frequency and generating N samples;

generating in a zero value generator M samples having a value of zero;

receiving the N samples and the M samples in a transformation circuit in form of a sequence having a length of N+M samples, transforming the sequence with a discrete Fourier transform in accordance with a Goertzel algorithm, and generating a series of discrete Fourier coefficients;

evaluating in an evaluating circuit the series of the discrete Fourier coefficients at different frequencies to identify said at least one given frequency in the multifrequency signal without using interpolation between the coefficients and providing said at least one given frequency as an output signal of the processing circuit.

2. A method according to claim 1, wherein the method includes the step of arranging in the transformation circuit the N samples and the M samples in such a manner that the M samples have an effect of samples having arrived chronologically prior to the N samples.

3. A method according to claim 2, wherein the method further includes the step of choosing a value of M+N to equal the sampling frequency in Hertz so that said at least one given frequency can be identified from a 1 Hz-grid.

4. A method according to claim 1, wherein the method further includes the step of choosing a value of M+N to equal the sampling frequency in Hertz so that said at least one given frequency can be identified from a 1 Hz-grid.

5. A method according to claim 1, wherein the method includes the step of choosing N equal to 205, choosing M equal 7,795 and the sampling frequency equals 8k HZ.

6. A dialing receiver for determining multifrequency dialing signals on an incoming signal in a telecommunication switching system, comprising;
   A) a sampling circuit for taking N values of the incoming signal N times at a given sampling rate, where N is a positive integer;
   B) a zero value generator circuit for supplementing at the given sampling rate the N values with M successive zero values so as to yield N+M values, where M is a positive integer;
   C) a discrete Fourier transformation circuit for performing a discrete Fourier transform (DFT) of said N+M values in accordance with a Goertzel algorithm and providing a result in form of a series of Fourier coefficients; and
   D) a result evaluating circuit for directly evaluating the results of the discrete Fourier transform (DFT) processing of the N+M values without interpolation so as to determine an identity of the multifrequency dialing signals.

7. A dialing receiver as defined in claim 6, wherein the transformation circuit includes means for arranging the M values having successive zero values so the M zero values have a effect of samples having arrived chronologically prior to the N values.

8. A dialing receiver as defined in claim 7, wherein an at least one given frequency has integer values in Hertz and the value of M+N is chosen to equal the sampling frequency in Hertz.

9. A dialling receiver as defined in claim 8, wherein the multifrequency dialling signals each comprise two different simultaneously present frequencies, and wherein each frequency is one of a set of eight predetermined frequencies.

10. A dialling receiver as defined in claim 7, wherein the multifrequency dialling signals each comprise two different simultaneously present frequencies, and wherein each frequency is one of a set of eight predetermined frequencies.

11. A dialing receiver according to claim 6, wherein the value of N equals 205, the value of M equals 7,795 and the sampling range equals 8k HZ.

12. Method for identifying at least one given frequency in a multifrequency signal in a dialing receiver, comprising, in combination, the steps of:
   sampling the multifrequency signal in a sampling circuit at a sampling frequency and generating N samples;
   generating in a zero value generator M samples having a value of zero;
   receiving the N samples and the M samples in form of a finite duration sequence of length N+M in a discrete Fourier transformation computation circuit, transforming successively said sequence with a discrete Fourier transform using a Goertzel algorithm, and generating a series of discrete Fourier coefficients;
   evaluating in a results evaluation circuit the presence of said at least one frequency of the multifrequency signal based on an absolute value of said coefficients at a given frequency without using interpolation between coefficients being evaluated and generating an output signal indicating presence of absence of said at least one frequency.

13. A method according to claim 12, wherein the method further includes the step of providing to the transformation circuit the N samples and the M zero values in such a manner that the M zero-value samples have an effect of samples having arrived chronologically prior to the N samples.

14. A method according to claim 13, wherein the method further includes the step of choosing a value of M+N to equal the sampling frequency in Hertz so that said at least one given frequency can be identified from a 1 Hz-grid.

15. A method according to claim 12, wherein the method further includes the step of choosing a value of M+N to equal the sampling frequency in Hertz so that said at least one given frequency can be identified from a 1 Hz-grid.

16. A method according to claim 12, wherein the method includes the step of choosing N equal to 205, choosing M to equal 7,795 and the sampling frequency equals 8k HZ.

* * * * *

UNITED STATES PATENT AND TRADEMARK OFFICE
CERTIFICATE OF CORRECTION

PATENT NO. : 5,353,344
DATED : October 4, 1994
INVENTOR(S) : M. Knitsch

It is certified that error appears in the above-indentified patent and that said Letters Patent is hereby corrected as shown below:

At column 7, line 15 (claim 5, line 3), prior to "equal", please insert --to--.

At column 8, line 8 (claim 11, line 3), please change "range" to --rate--; and at line 29 (claim 12, line 21), please change "of" to --or--.

Signed and Sealed this

Eighteenth Day of April, 1995

Attest:

BRUCE LEHMAN

Attesting Officer

Commissioner of Patents and Trademarks